United States Patent [19]
Disselbeck et al.

[11] Patent Number: 5,804,025
[45] Date of Patent: Sep. 8, 1998

[54] PROCESS FOR INCIPIENT OR COMPLETE MELTING OF POLYESTER-COMPRISING SHAPED STRUCTURES BY HIGH FREQUENCY WELDING AND USE OF SUCH POLYESTERS

[75] Inventors: Dieter Disselbeck, Bad Soden; Hans-Joachim Brüning, Augsburg; Bernhard Jahn, Klosterlechfeld; Klaus Bender, Wehringen, all of Germany

[73] Assignee: Hoechst Trevira GmbH & Co KG, Germany

[21] Appl. No.: 818,178

[22] Filed: Mar. 14, 1997

[30] Foreign Application Priority Data

Mar. 16, 1996 [DE] Germany ............ 196 10 481.5

[51] Int. Cl.⁶ .................................. B32B 31/28
[52] U.S. Cl. .................... 156/274.4; 156/308.2
[58] Field of Search ............... 156/272.2, 274.4, 156/275.1, 308.4, 332, 308.2; 219/765, 764

[56] References Cited

U.S. PATENT DOCUMENTS 4,810,434  3/1989  Gines ................................. 156/272.2
5,686,527  11/1997  Laurin et al. ......................... 525/66

*Primary Examiner*—Michael W. Ball
*Assistant Examiner*—Michael A. Tolin
*Attorney, Agent, or Firm*—Connolly & Hutz

[57] ABSTRACT

The use is disclosed of modified polyesters, for example isophthalic acid modified polyethylene terephthalate in high frequency welding. The process is useful for incipient or complete melting of shaped structures, especially sheets, films, coats, hollow articles, injection-molded articles, yarns and textile sheet materials comprising such yarns, composed of such polyesters. The process can be carried out with customary high frequency welding equipment.

11 Claims, No Drawings

PROCESS FOR INCIPIENT OR COMPLETE MELTING OF POLYESTER-COMPRISING SHAPED STRUCTURES BY HIGH FREQUENCY WELDING AND USE OF SUCH POLYESTERS

The present invention relates to a process wherein selected polyesters are melted incipiently or completely by high frequency welding.

It is known that shaped pieces of plastic can be joined together by welding. A very wide range of welding techniques can be used, including high frequency welding (cf. Römpp Chemie Lexikon, entryword "Kunststoff-Schwei⊖en", p. 2402, 9th edition, G. Thieme Verlag (1990)).

The patent literature contains several references to the use of welding techniques for the joining together of shaped pieces of plastic, for example fibers or fibrous textile sheet materials. For instance, DE-A-3,714,935 describes artificial hair composed of thermoplastics, which has a specific shape and is suitable for hair implantation. A processing step in the manufacture of this hair comprises welding the thermoplastic. Various thermoplastics are mentioned in the general description, including polyester.

DE-A-2,750,593 describes a process and apparatus for high frequency splicing of elementary thermoplastic filaments. No details are disclosed about the material used.

ES-A-86-07,816 describes the high frequency welding of a polyamide fabric.

Finally, DE-B-1,704,179 discloses a process for joining together films by the use of a heatable and heat-storing material. A number of suitable plastics are mentioned; polyester is not among them.

It is common knowledge that commercially available polyesters, for example polyethylene terephthalate (PET), are not suitable for high frequency welding. For instance, on p. 505 of the textbook by H. Domininghaus "Die Kunststoffe und ihre Eigenschaften", 3rd edition, VDI Verlag GmbH, Düsseldorf 1988, it is mentioned that PET is not HF-weldable.

There have now been found selected polyesters which are suitable for the high frequency welding technique and which are therefore simple and economical to process.

The present invention accordingly provides a process for incipient or complete melting of shaped structures, which comprises:

a) providing a shaped structure composed of a polyester containing at least 5 mol % of the structural repeat unit of the formula I and/or at least 5 mol % of the structural repeat unit of the formula II

and

where $Ar^1$ and $Ar^2$ are each independently of the other a bivalent mono- or polycyclic aromatic radical whose free valences are disposed meta or comparably angled to each other, preferably 1,3-phenylene, $R^1$ is a bivalent aliphatic or cycloaliphatic radical, preferably a radical of the formula —$C_nH_{2n}$—, where n is an integer between 2 and 6, especially ethylene, or a radical derived from cyclohexanedimethanol, and $R^2$ is a bivalent aliphatic, cycloaliphatic or mono- or polycyclic aromatic radical, and b) applying high frequency electromagnetic radiation, preferably in the radiowave range, at such an intensity and for such a period that at least part of the shaped structure melts incipiently or completely.

The shaped structures used can be any desired one-, two- or three-dimensional structures having at least such a proportion of the above-defined modified polyester that incipient or complete melting can be achieved by high frequency welding. The structures in question are in particular sheets, films, coats, hollow articles and injection-molded articles and also, very particularly preferably, yarns and/or textile sheet materials comprising such yarns.

The term "yarn" is herein to be understood in its broadest sense; the yarns in question are thus staple fiber yarns or, preferably, filament yarns.

A particularly preferred embodiment of the process of this invention utilizes a hybrid yarn comprising reinforcing fibers, preferably reinforcing filaments, and lower melting matrix fibers, preferably matrix filaments, composed of the above-defined polyesters.

The polyester matrix fibers are preferably fibers having a melting point which is at least 10° C., especially at least 30° C., below the melting or decomposition point of the reinforcing filaments.

Very particular preference is given to using hybrid yarns in which the reinforcing fibers have an initial modulus of greater than 50 GPa and preferably consist of glass, carbon or aromatic polyamide.

A further particularly preferred embodiment utilizes hybrid yarns in which the reinforcing fibers have an initial modulus of greater than 10 GPa and consist of polyester, especially polyethylene terephthalate.

The modified polyesters used are known per se. A typical and particularly preferred representative of such polyesters is isophthalic acid modified polyethylene terephthalate.

Very particular preference for use in the process of this invention is given to shaped structures comprising a modified polyethylene terephthalate containing the structural repeat units of the formulae III and IV

and

where $Ar^3$ is a bivalent mono- or polycyclic aromatic radical whose free valences are disposed para or comparably parallel or coaxial to each other, preferably 1,4-phenylene and/or 2,6-naphthylene, $R^3$ and $R^4$ are independently of each other bivalent aliphatic or cycloaliphatic radicals, especially radicals of the formula —$C_nH_{2n}$—, where n is an integer between 2 and 6, especially ethylene, or a radical derived from cyclohexanedimethanol, and $Ar^4$ is a bivalent mono- or polycyclic aromatic radical whose free valences are disposed meta or comparably angled to each other, preferably 1,3-phenylene.

Any bivalent aromatic radicals in the above-defined formulae are bivalent aromatic radicals whose valence bonds are disposed para or comparably coaxial or parallel to each other or whose valence bonds are disposed meta or comparably angled to each other. A small proportion of aromatic radicals having valence bonds in an angled arrangement may also have valence bonds disposed ortho or comparably angled.

Any bivalent aromatic radicals in the above-defined formulae whose valence bonds are disposed meta or comparably angled to each other are monocyclic or polycyclic aromatic hydrocarbons or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or linked to one another via C—C bonds or via bridging groups, for example —O—, —CH$_2$—, —S—, —CO— or —SO$_2$—.

Examples of preferred bivalent aromatic radicals whose valence bonds are disposed meta or comparably angled to each other are monocyclic aromatic radicals having free valences disposed meta to each other, especially 1-3-phenylene, or bicyclic fused aromatic radicals having mutually angled bonds, in particular 1,6- and 2,7-naphthylene, or bicyclic aromatic radicals linked via a C—C bond and having mutually angled bonds, especially 3,4'-biphenylene.

Any bivalent aromatic radicals in the above formulae whose valence bonds are disposed para or comparably coaxial or parallel to each other are monocyclic or polycyclic aromatic hydrocarbon radicals or heterocyclic aromatic radicals which can be monocyclic or polycyclic. Heterocyclic aromatic radicals have in particular one or two oxygen, nitrogen, or sulfur atoms in the aromatic nucleus.

Polycyclic aromatic radicals can be fused to one another or be bonded linearly to one another via C—C bonds or via —CO—NH— groups.

The valence bonds in mutually coaxial or parallel disposition point in opposite directions. An example of coaxial bonds pointing in opposite directions are the diphenyl-4,4'-ene bonds. An example of parallel bonds pointing in opposite directions are the naphthalene-1,5- or -2,6 bonds, whereas the naphthalene-1,8 bonds are parallel but point in the same direction.

Examples of preferred bivalent aromatic radicals whose valence bonds are disposed para or comparably coaxial or parallel to each other are monocyclic aromatic radicals having free valences disposed para to each other, especially 1,4-phenylene, or bicyclic fused aromatic radicals having parallel bonds pointing in opposite directions, especially 1,4-, 1,5- and 2,6-naphthylene, or bicyclic aromatic radicals linked via a C—C bond but having coaxial bonds pointing in opposite directions, especially 4,4'-biphenylene.

Any bivalent aliphatic or cycloaliphatic radicals in the above-defined formulae are groups derived from an aliphatic or cycloaliphatic primary, secondary or tertiary alcohol or from an alkane- or cycloalkane-dicarboxylic acid or their polyester-forming derivatives, such as methyl esters.

Preferred aliphatic bivalent radicals have 2 to 8 carbon atoms. Examples are ethylene, 1,3-propanediyl, 1,4-butanediyl, 1,6-hexanediyl or 1,8-octanediyl. Ethylene is particularly preferred.

Preferred cycloaliphatic radicals have 6 ring carbon atoms. Preferred examples are 1,4-cyclohexanedimethanol or 1,4-cyclohexanediyl.

All these above-enumerated radicals can be substituted by preferably one to two inert radicals. Examples are alkyl or alkoxy groups or halogen atoms. These include in particular alkyl groups having 1 to 6 carbon atoms, which can be branched or preferably straight-chain, and very particularly preferably methyl or ethyl; or alkoxy groups having 1 to 6 carbon atoms in the alkyl radical, which can be branched or preferably straight-chain, very particularly preference being given to methoxy or ethoxy; or chlorine or bromine.

Any radical of a cycloaliphatic dicarboxylic acid is customarily a group having a ring possessing five or in particular six carbon atoms; 1,4-cyclohexylene, for example.

The modified polyesters used for this invention customarily have an intrinsic viscosity of at least 0.5 dl/g, preferably 0.6 to 1.5 dl/g. The intrinsic viscosity is measured in a solution of the copolyester in dichloroacetic acid at 25° C.

The process of this invention makes it possible to apply to polyesters all the well known advantages of applying high frequency welding to other plastics. These advantages include, for example, the speed of the process, the possibility of dispensing with additional welding or adhesive media and also - since the electrodes remain cold during the process - the absence of any thermal stress on HF-unresponsive welding partners.

The particular advantage of the process of this invention is that it does not require any specially adapted equipment. The process can be carried out with the customary equipment known for high frequency welding.

The process of this invention customarily utilizes high frequency electromagnetic radiation within the frequency range from 10 kHz to 2000 MHz, preferably 20–200 MHz, particularly preferably 25–72 MHz, especially about 27 MHz.

Customary energy densities vary within the range from about 5 to 100 W/cm$^2$.

Customary welding times range from 1 to 100 sec, preferably from 10 to 30 sec.

The welding process can be carried out without applying pressure to the parts to be joined together. It is preferable to apply additional pressure.

The process of this invention makes it possible for parts molded from polyester or from polyester and other materials to be bonded, end-itemed or wholly, partly or prepatternizedly melted incipiently or completely.

Particular preference is given to using shaped structures comprising a modified polyethylene terephthalate containing 40 to 95 mol % of structural repeat units of the formula III and 60 to 5 mol % of structural repeat units of the formula IV where Ar$^3$ is 1,4-phenylene and/or 2,6-naphthylene, R$^3$ and R$^4$ are each ethylene and Ar$^4$ is 1,3-phenylene.

A further particularly preferred embodiment of the process of this invention comprises consolidating and/or bonding textile sheet materials, especially wovens, lays, knits or nonwovens.

The invention also relates to the use of the above-defined polyesters for incipient or complete melting by high frequency welding.

The examples which follow explain the invention without limiting it.

EXAMPLE 1

A staple fiber web consisting of 70% by volume of a fiber 1 and 30% by volume of a fiber 2, fiber 1 being a core-sheath fiber having 50% by volume of a core of polyethylene terephthalate and 50% by volume of a sheath of isophthalic acid modified polyethylene terephthalate (isophthalic acid content [based on the acid components] 40 mol %) and fiber 2 being a fiber of polyethylene terephthalate, was HF-densified (27 MHz) for 10 seconds at 40 W/cm$^2$ under a pressure of 5 bar. The sheath portion of fiber 1 melted and adhered the remaining fiber portions together. Good densification and consolidation was achieved.

EXAMPLE 2

A staple fiber web consisting of 70% by volume of a fiber 3 and 30% by volume of a fiber 4, fiber 3 being a fiber of isophthalic acid modified polyethylene terephthalate (isophthalic acid content [based on the acid components] 40 mol %) and fiber 4 being a fiber of polyethylene terephthalate, was HF-densified (27 MHz) for 10 seconds at 40 W/cm$^2$ under a pressure of 5 bar. A distinctly better consolidation and a smoother surface for the resulting sheet material were observed. Fiber 3 melted completely and formed a matrix around the remaining fiber components.

EXAMPLE 3

Two 2 mm thick glass fiber reinforced (50% by volume of glass) polyester strips each 20 mm in width were placed on top of each other with a 25 mm overlap and welded together by HF. The polyester consisted of isophthalic acid modified polyethylene terephthalate having an isophthalic acid content (based on the acid components) of 40 mol %. Inspection showed the two strips to be properly welded together.

EXAMPLE 4

Two 2 mm thick glass fiber reinforced (50% by volume of glass) polyester strips each 20 mm in width were placed on top of each other with a 25 mm overlap and welded together by HF. The polyester consisted of isophthalic acid modified polyethylene terephthalate having an isophthalic acid content (based on the acid components) of 33 mol %. Inspection showed the two strips to be properly welded together.

COMPARATIVE EXAMPLE

Two 2 mm thick glass fiber reinforced (50% by volume of glass) polyester strips each 20 mm in width were placed on top of each other with a 25 mm overlap and welded together by HF. The machine settings were the same as those in Examples 3 and 4. The polyester consisted of polyethylene terephthalate. Inspection showed a complete absence of welding between the two strips.

What is claimed is:

1. A process for incipient or complete melting of shaped structures, which comprises:
    a) providing a shaped structure composed of a polyester containing at least 5 mol % of the structural repeat unit of the formula I and/or at least 5 mol % of the structural repeat unit of the formula II $$—O—OC—Ar^1—CO—O—R^1— \quad (I),$$

and $$—O—OC—R^2—CO—O—Ar^2— \quad (II),$$

where $Ar^1$ and $Ar_2$ are each independently of the other a bivalent mono- or polycyclic aromatic radical, $R^1$ is a bivalent aliphatic or cycloaliphatic radical, or a radical derived from cyclohexanedimethanol, and $R^2$ is a bivalent aliphatic, cycloaliphatic or mono- or polycyclic aromatic radical, and b) applying high frequency electromagnetic radiation, at such an intensity and for such a period that at least part of the shaped structure melts incipiently or completely.

2. The process of claim 1, wherein the shaped structure is a yarn comprising staple fibers or filaments composed of the polyester or the shaped structure is a textile sheet material comprising such a yarn.

3. The process of claim 2, wherein the yarn is provided in the form of a hybrid yarn comprising reinforcing fibers, preferably reinforcing filaments, and lower melting matrix fibers, composed of polyesters, wherein said polyesters contain at least 5 mol % of the structural repeat unit of the formula I and/or at least 5 mol % of the structural repeat unit of the formula II.

4. The process of claim 3, wherein the polyester matrix fibers have a melting point which is at least 30° C. below the melting or decomposition point of the reinforcing filaments.

5. The process of claim 3, wherein the reinforcing fibers have an initial modulus of greater than 50 GPa and consist of glass, carbon or aromatic polyamide.

6. The process of claim 3, wherein the reinforcing fibers have an initial modulus of greater than 10 GPa and consist of polyester.

7. The process of claim 1, wherein the shaped structure comprises a modified polyethylene terephthalate containing the structural repeat units of the formulae III and IV $$—O—OC—Ar^3—CO—O—R^3— \quad (III),$$

and $$—O—OC—Ar^4—CO—O—R^4— \quad (IV),$$

where $Ar^3$ is a bivalent mono- or polycyclic aromatic radical $R^3$ and $R^4$ are independently of each other bivalent aliphatic or cycloaliphatic radicals, and $Ar^4$ is a bivalent mono- or polycyclic aromatic radical.

8. The process of claim 7, wherein the formed structures comprise a modified polyethylene terephthalate containing 40 to 95 mol % of structural repeat units of the formula III and 60 to 5 mol % of structural repeat units of the formula IV where $Ar^3$ is 1,4-phenylene and/or 2,6-naphthylene, $R^3$ and $R^4$ are each ethylene and $Ar^4$ is 1,3-phenylene.

9. A process for consolidating and/or bonding textile sheet materials, which comprises:
    a) providing a textile sheet material comprising yarns produced by providing a shaped structure composed of a polyester containing at least 5 mol % of the structural repeat unit of the formula I and/or at least 5 mol % of the structural repeat unit of the formula II $$—O—OC—Ar^1—CO—O—R^1— \quad (I),$$

and $$—O—OC—R^2—CO—O—Ar^2— \quad (II),$$

where $Ar^1$ and $Ar^2$ are each independently of the other a bivalent mono- or polycylic, aromatic radical, $R^1$ is a bivalent aliphatic or cycloaliphatic radical or, a radical derived from cyclohexanedimethanol, and $R^2$ is a bivalent aliphatic, cycloaliphatic or mono- or polycyclic aromatic radical, and b) applying high frequency electromagnetic radiation at such an intensity and for such a period that at least part of the yarns in the textile sheet material melts incipiently or completely.

10. The process of claim 1, wherein the shaped structure is selected from the group consisting of sheets, films, coats, hollow articles, injection-molded articles, yarns, and textile sheet materials comprising such yarns.

11. The process of claim 9, wherein the textile sheet materials are selected from the group consisting of wovens, lays, knits, and nonwovens.

* * * * *